June 30, 1942.   T. W. SCHETTLER, JR   2,287,907
BABY BED
Filed April 4, 1940   3 Sheets-Sheet 1

INVENTOR
THEODORE W. SCHETTLER, JR.,
ATTORNEYS

June 30, 1942. T. W. SCHETTLER, JR 2,287,907
BABY BED
Filed April 4, 1940 3 Sheets-Sheet 3

INVENTOR
THEODORE W. SCHETTLER, JR.,
BY Minturn & Minturn
ATTORNEYS

Patented June 30, 1942

2,287,907

UNITED STATES PATENT OFFICE 2,287,907

BABY BED

Theodore W. Schettler, Jr., Indianapolis, Ind.

Application April 4, 1940, Serial No. 327,760

1 Claim. (Cl. 5—98)

This invention relates to a baby bed, a primary object of which is to provide a structure to permit collapsing into a compact arrangement wherein the entire bed, including its floor, side and end walls, together with bedding may be brought into an extremely compact package of comparatively small dimensions so that it may be carried about by hand with ease. The structure finds particular use in making automobile trips and the like, in which event the collapsed structure may be carried in the automobile so as to occupy little space and then may be set up at the end of the trip quite easily and be ready for use within a very short interval of time. It frequently happens that there are little or no accommodations for babies in hotels or the like and my structure fills the need in this respect.

A further primary object of the invention is to provide a collapsible framework that may be maintained in comparatively rigid condition by the bed floor and side and end walls drawing the framework together and thus maintaining it in the set-up condition. A further primary object of the invention is to make the floor of the bed and the various walls out of canvas to give the desired strength and at the same time to permit washing thereof. Means are provided in the canvas members for adjusting the lengths and widths thereof respectively in order to maintain the desired and required tension in those members.

Further objects and advantages of the invention, such as the achievement of structural strength with minimum weight, relatively low cost of production, neat appearance, a smooth enclosure without openings through which the baby might become caught, and the like, will become apparent to those versed in the art in the following description of the invention as shown in the accompanying drawings, in which—

Figure 1:
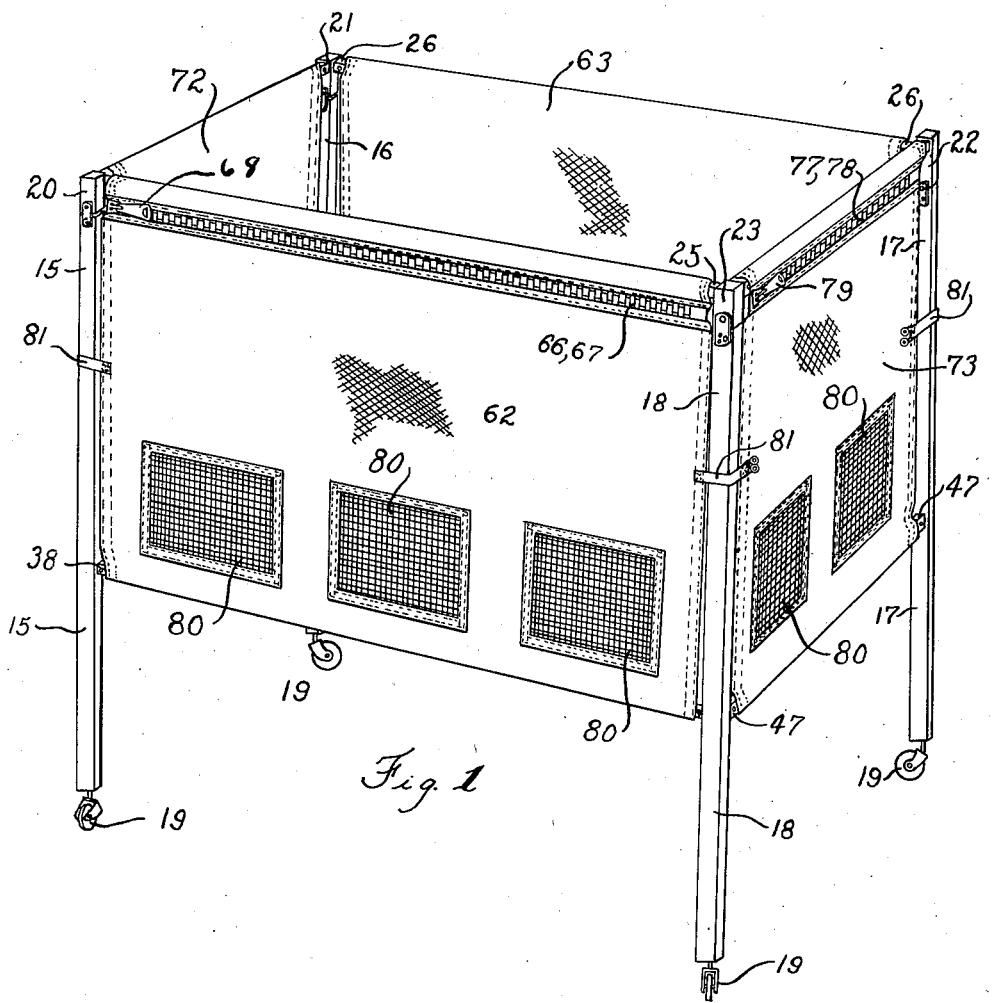
Figure 2:
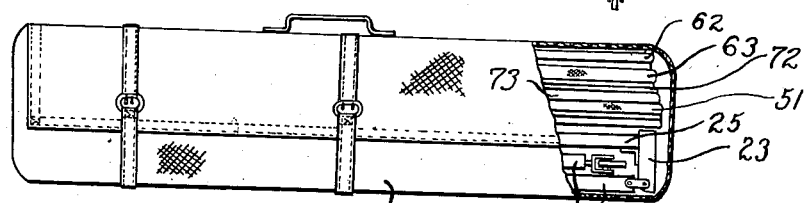
Figure 3:
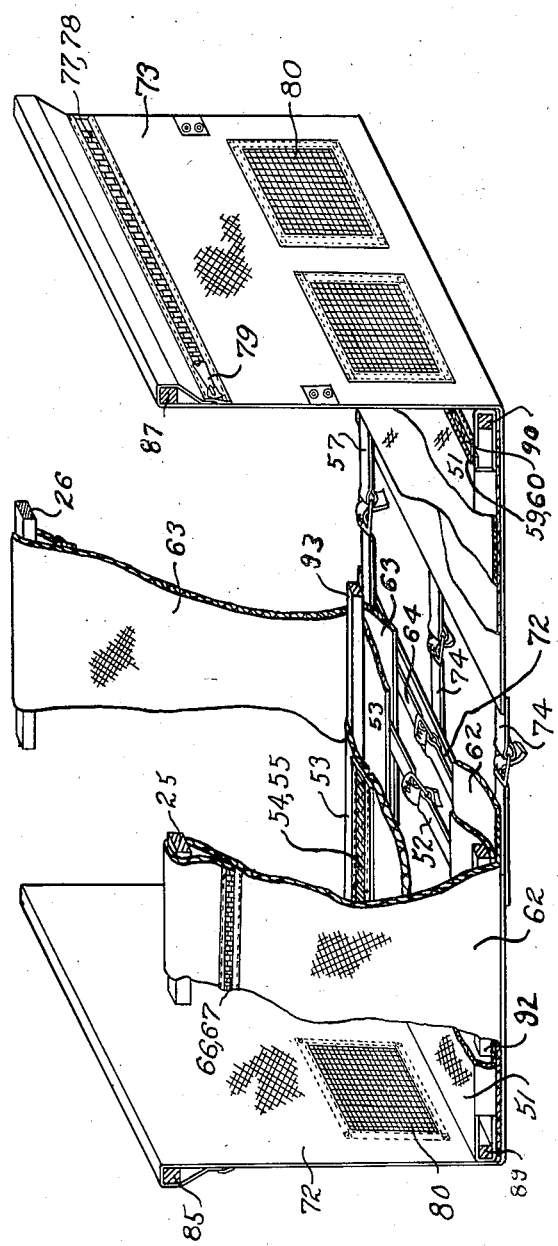
Figure 4:
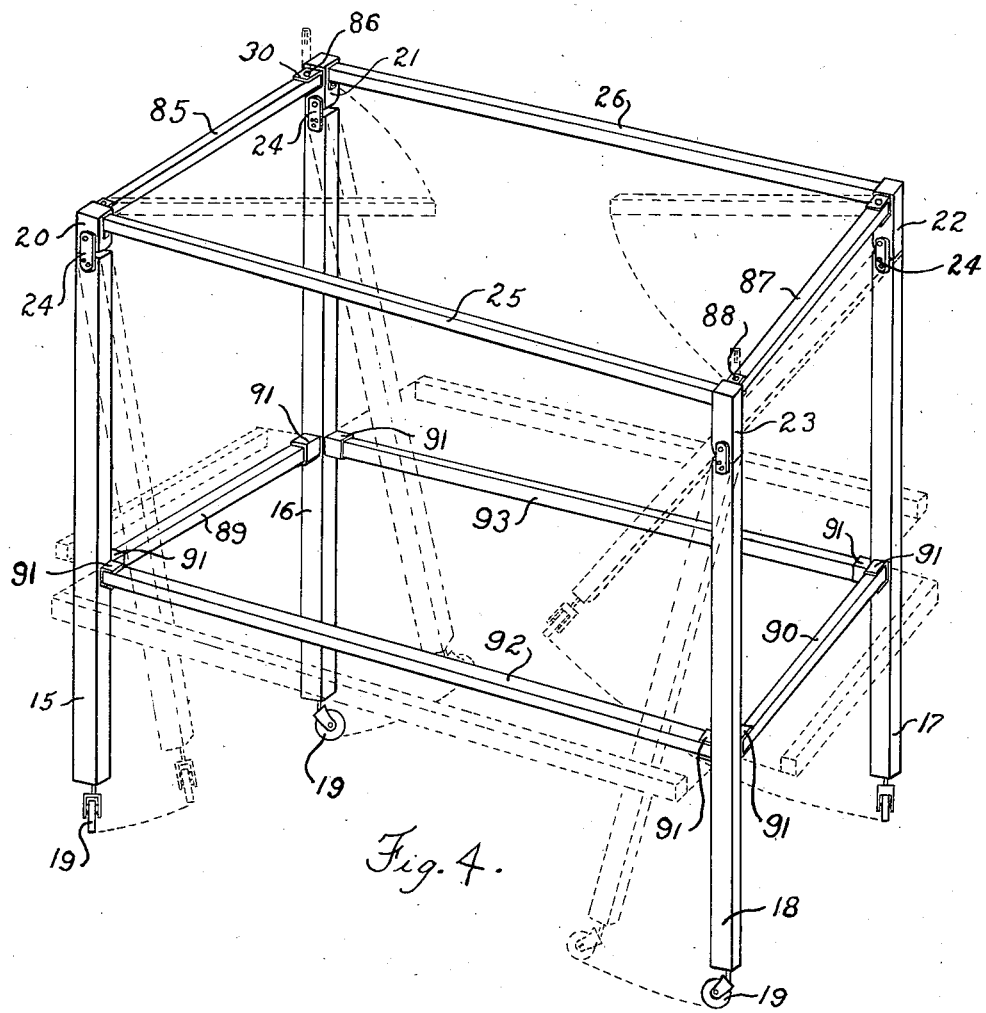

Fig. 1 is a side view in perspective of a bed embodying my invention set up ready for use;

Fig. 2, a side elevation of the bed collapsed and in its carrying bag ready for transportation;

Fig. 3, a detail in fragmentary form in side perspective of the general arrangement of various canvas members;

Fig. 4, a side view in perspective of the bed frame; and

Figure 5:
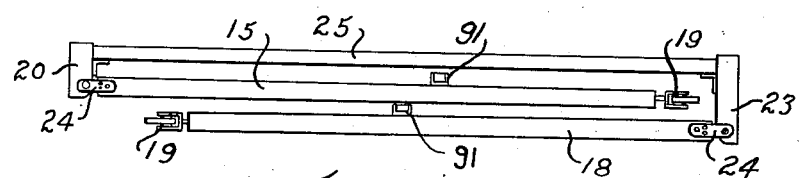

Fig. 5, a view in side elevation of the bed frame in collapsed condition.

Like characters of reference indicate like parts throughout the several views in the drawings.

Referring to Figs. 4 and 5 illustrating the framework on the bed, four corner posts 15, 16, 17, and 18 are employed and preferably have casters 19 fitted in their lower ends. Each of these corner posts has an upper end portion 20, 21, 22, and 23 respectively hinged thereto by side straps 24 in such manner that these end portions, when carried to their vertical positions in alignment with their respective posts, are limited in outward travel to that vertical position in each case by reason of the under, outer edge coming into abutment with the top end of its post, the under ends of these respective end portions being rounded off on their insides to permit the posts thereunder to swing inwardly one toward the other within the perspective planes of the legs 15, 18 forming the one plane and 16, 17 forming the other plane. A top side rail 25 is permanently connected by its outer ends to the respective upper post end portions 20 and 23 so that relative movement between the post 15 and its upper end portion 20 and likewise the end portion 23 and its post 18 is had by shifting the posts one toward the other rather than rocking the end portions on the posts.

In the same manner a top side rail 26 is rigidly connected by its ends to the post top end portions 21 and 22. A top end rail 85 is hinged by one end to the top post portion 20 so as to swing in a plane including the side rail 25, the other end swinging into the clip 30 fixed on the top post portion 21 and there secured by any suitable means, either by a latch or by a pin 86 extending therethrough. In like manner the other top end rail 87 is hinged to the top post portion 22 to swing in a plane including the side rail 26. Its free end is likewise engaged with the top post portion 23 by any suitable means such as by the pin 88. Lower end rails 89 and 90 fit into abutments 91 by their respective ends so that the rails may be pulled outwardly horizontally from between the posts as indicated by the dash lines, the abutments 91 forming stops to limit inward travel of the end rails one toward the other. In like manner the lower side rails 92 and 93 are entered by their ends into abutments carried by the respective posts to permit withdrawal of those rails horizontally but holding the rails in position against inward travel from their normal positions between the posts.

To collapse the frame, these lower side and end rails are removed, the top end rails 85 and 87 released and swung around against their respective rails 25 and 26 whereupon the legs 15 and 18 may be folded respectively around up toward the rail 25 and the posts 16 and 17 around toward their interconnecting rail 26. Then all of the separate lower rails together with these two folded side combinations may be inserted in the traveling bag 49.

It is to be particularly noted that in this frame the lower rails are held against displacement by the various canvas members wrapping therearound tending to pull these lower rails into firm engagement with their abutments. The canvas members may be folded and packed along with the required bedding in the traveling bag 49 so that the whole collapsed structure may then be transported with ease. Preferably the frame members are made out of wood to prevent excess weight although, of course, the various fittings are made of metal.

A floor section is applied to the frame by placing the major floor section 51 over the upper sides of the end rails 89 and 90 to have the straps 57 thereunder and the slide fastener portion 59 brought around to meet the other portion 60 on the upper side and inwardly of the rail 90, Fig. 3. Then the straps 52 are carried around the rail 92 to have the canvas portion 53 wrap up around the lower rail 93 and thereover to bring the slide fastener portion 54 into engagement on the upper and inner side thereof with the slide fastener portion 55. The lengths of the straps 52 and 57 are previously determined in order to secure the desired tension or stretch in the top floor section 51. It is to be seen that by thus wrapping the floor canvas 50 around the side and end rails, these various members are held snugly in position against any tendency of displacement.

Two side walls 62 and 63 assembled are applied to the bed by bringing the top end of the wall 62 around over the top of the side rail 25 and interengaging the slide fastener portions 66 and 67 by means of the slide member 68. The lower portion of the wall 62 is long enough to wrap around under the lower side rail 92 a short distance to position the strap 64 between the rails 92 and 93 when the side wall 63 is pulled around and upwardly from the rail 93 and carried over the top rail 26 and then downwardly on the outer side thereof to engage by an end with the wall 63 below the rail 26, the strap 64 having been previously adjusted to bring the side walls 62 and 63 into the required degree of tension.

Referring to Fig. 3, an end wall 73 is brought up on the inner side of the top end rail 87 and folded around thereover to bring the slide fastener section 77 down into engagement with the section 78 and there interengaged by the slide member 79. The lower end of the wall 73 is folded back under the end rail 90 to have the straps 74 positioned substantially centrally under the bed and the other end wall 72 is pulled around the opposite lower end rail 89 and upwardly therefrom to be carried inside of the top end rail 85 and around thereover and down on the outer side to be there secured by a like slide fastener. The straps 74 are previously adjusted to give the required degree of tension in those end walls 72 and 73.

Thus it is to be seen that through the application of the side and end walls, the various members of the frame are pulled inwardly tending to stiffen the entire framework and to prevent accidental displacement of any of the members thereof. Preferably the side and end walls are provided with windows 80 therethrough covered by suitable wire cloth. Also to prevent any gapping at the corner posts, the side walls 62 and 63 are provided with elastic straps 81 to extend around the outer sides of the posts, as indicated in Fig. 1, these straps being releasably engaged with the end walls by any suitable means, herein indicated as by hooks and eyes. It is obvious that these straps 81 may be expanded into a continuous length of material up and down the posts so as to completely cover over any crack or gap that might appear in time, particularly after washing the canvas or the like.

While I have herein shown and described my invention in the best form as known to me, it is obvious that structural variations may be employed without departing from the spirit of the invention and I, therefore, do not desire to be limited to that precise form beyond the limitations as may be imposed by the following claim.

I claim:

In a portable collapsible baby bed, four corner posts each post comprising separate upper and lower portions, a top side rail fixed to the upper end portions of a pair of said posts, a top side rail fixed parallel to the first side rail to the upper end portions of the other posts, top end rails engaging the upper end portions of corresponding posts, lower side and end rails removably engaging respectively with said lower post portions at a common horizontal elevation, all to form a bed frame, and canvas sections wrapping around said rails to form a floor area, side and end walls, and serving as bed frame stabilizing means, said upper post end portions being hinged to their lower post portions to permit swinging of the lower post portions inwardly under their respective interconnecting top side rails when their lower side rails are removed to permit frame collapsing, said lower side and end rails being removably received by their ends in post carried sockets, said canvas sections serving to draw and retain those lower rails in said sockets, said top end rails being hinged by one end each to the respective top end portions of diagonally opposite posts and detachably connected by the other end to the other diagonally opposite posts so as to permit these end rails to swing around toward the top side rails extending from those posts to which they are hinged.

THEODORE W. SCHETTLER, Jr.